(12) United States Patent
Okuda et al.

(10) Patent No.: US 8,557,885 B2
(45) Date of Patent: Oct. 15, 2013

(54) EXTRUDED THERMOPLASTIC RESIN FOAM

(75) Inventors: Akira Okuda, Kanuma (JP); Tatsuyuki Ishikawa, Kanuma (JP); Naochika Kogure, Kanuma (JP); Kazunobu Sato, Kanuma (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 13/081,082

(22) Filed: Apr. 6, 2011

(65) Prior Publication Data

US 2011/0250421 A1   Oct. 13, 2011

(30) Foreign Application Priority Data

Apr. 9, 2010 (JP) ................................. 2010-090555

(51) Int. Cl.
| | |
|---|---|
| *C08J 99/00* | (2006.01) |
| *C08J 9/16* | (2006.01) |
| *C08J 9/00* | (2006.01) |
| *C08L 67/00* | (2006.01) |
| *C08L 77/00* | (2006.01) |
| *B22C 1/22* | (2006.01) |

(52) U.S. Cl.
USPC ................. 521/81; 521/59; 521/79; 521/134; 521/138; 521/139

(58) Field of Classification Search
USPC .................. 521/79, 81, 134, 59, 138, 139
See application file for complete search history.

(56) References Cited

U.S. PATENT DOCUMENTS

| | | | | |
|---|---|---|---|---|
| 2,945,008 | A * | 7/1960 | Caldwell et al. ................. | 528/73 |
| 6,391,931 | B1 * | 5/2002 | Gehlsen et al. ................. | 521/50 |
| 6,447,859 | B2 * | 9/2002 | Oguro et al. ................. | 428/35.7 |
| 7,166,248 | B2 * | 1/2007 | Francis et al. ................. | 264/50 |
| 2007/0208094 | A1 * | 9/2007 | Handa et al. ................. | 521/79 |
| 2009/0234035 | A1 | 9/2009 | Cheung et al. | |
| 2009/0270524 | A1 * | 10/2009 | Oka et al. ................. | 521/138 |

(Continued)

FOREIGN PATENT DOCUMENTS

| | | |
|---|---|---|
| EP | 1 683 828 A2 | 7/2006 |
| JP | A-2000-136258 | 5/2000 |
| JP | A-2002-144497 | 5/2002 |

(Continued)

OTHER PUBLICATIONS

EASTAR® Copolyester 6763 Technical Information Brochure, 2012, Eastman Chemical Company, p. 10.*
European Search Report dated Aug. 23, 2011 issued in European Patent Application No. 11002923.8.

*Primary Examiner* — Melissa Rioja
(74) *Attorney, Agent, or Firm* — Oliff & Berridge, PLC (57) ABSTRACT

The present invention relates to an extruded thermoplastic resin foam, particularly relates to a board extruded thermoplastic resin which has low heat conductivity, an excellent heat insulating property over a long period of time, high flame retardancy, and excellent mechanical strength.

The extruded thermoplastic resin foam having an apparent density of 20 to 50 kg/m$^3$, a closed cells ratio of 85% or more and a thickness of 10 to 150 mm, and containing a non-halogen organic physical blowing agent, wherein the thermoplastic resin composing the extruded foam contains a mixture of 100 parts by weight of a polystyrene resin (A) and 5 to 150 parts by weight of a polyester resin (B), and an endothermic calorific value of the polyester resin (B) less than 5 J/g (including 0) for fusion of the polyester resin on a DSC curve obtained by heat flux differential scanning calorimetry based on JIS K7122 (1987).

8 Claims, 1 Drawing Sheet

(56) References Cited

U.S. PATENT DOCUMENTS

2010/0178524 A1* 7/2010 Yoshimura et al. ............ 428/480
2011/0306730 A1* 12/2011 Crawford et al. .............. 525/133
2012/0040117 A1* 2/2012 Uehara et al. ................. 428/35.2

FOREIGN PATENT DOCUMENTS

| | | |
|---|---|---|
| JP | A-2006-131719 | 5/2006 |
| JP | A-2006-131757 | 5/2006 |
| WO | WO 2008029842 A1 * | 3/2008 |

* cited by examiner

EXTRUDED THERMOPLASTIC RESIN FOAM

FIELD OF THE INVENTION

The present invention relates to an extruded thermoplastic resin foam, particularly relates to a board-like extruded thermoplastic resin which has low thermal conductivity, an excellent heat insulating property over a long period of time, high flame retardancy, and excellent mechanical strength. The extruded thermoplastic resin foam in the present invention is useful as a heat insulating material for walls, floors, and roofs, and the like of buildings.

BACKGROUND OF THE INVENTION

An extruded polystyrene resin foam has excellent heat insulating property and mechanical strength, thus a molded article is widely used as a heat insulator and the like. Therefore, styrenic resin foams in the form of board having a certain width have been widely used as insulating materials. Such a foam is usually produced as follows: a styrenic resin is heated and molten in an extruder, the melt is mixed with a physical blowing agent to make a foamable molten resin composition, the foamable molten resin composition is extruded and foamed through, for example, a slit die provided at the tip of the extruder into a low-pressure region, and, as necessary, the foam is molded by a shaping device connected to the outlet of the die.

As physical blowing agents used for producing extruded polystyrene resin foam, chlorofluorocarbons (hereinafter abbreviated as "CFCs") such as dichlorodifluoromethane have been widely used. However, since CFCs have high risk of depleting the ozone layer, hydrogenated chlorofluorocarbons (herein after, abbreviated as "HCFCs") having low ozone depletion potentials are used instead of CFCs. Nevertheless, since the ozone depletion potential of HCFCs are not 0 (zero), HCFCs still have risk of depleting the ozone layer. Under these circumstances, recently, hydrofluorocarbons (herein after, abbreviated as "HFCs") having an ozone depletion potential of 0 (zero) and no chlorine atom in the molecule have been used as blowing agents.

HFCs are preferred from the view point of ozone depleting potentials, but HFCs have high global warming potentials, so that is still room for an improvement from the viewpoint of the global environmental protection. Therefor, methods of producing an extruded thermoplastic resin foams which have the ozone depletion potential of 0 (zero), also have low global warming potentials, and uses a blowing agents with small effect on the environment, have been studied.

As a physical blowing agent, alipatic hydrocarbons or an alicyclic hydrocarbons such as propane, normal butane, isobutane, normal pentane, cyclopentane, and isopentane (herein below, these hydrocarbons are referred to as "HC") has an ozone depletion potential of 0 (zero) and low global warming potentials, and therefore there are a favorable blowing agents from the viewpoint of global environmental protection. In practice, some HCs are used as substitute blowing agents for the freons described above.

Meanwhile, the thermal conductivity of the extruded thermoplastic resin foam is also influenced by a blowing agent remaining in the foam. The permeation rates of the HCs through out a styrene resin are much lower than that of air, but higher than that of freons. As such, the HCs permeate a foam faster than the freons. Thus, when the HCs are used as a blowing agent, the thermal conductivity of a foam increases more quickly as compared with the thermal conductivity when freons are used as a blowing agent.

Therefore, in regard to the extruded thermoplastic resin foam that is obtained by using the HC as a physical blowing agent, it is difficult to maintain the heat insulating property for a long period of time.

A foam prepared by a resin used of a high gas barrier resin dispersed in a polystyrene resin has been suggested. Japanese Patent Application Laid-Open (JP-A) Nos. 2006-131719 and 2006-131757 disclose methods for producing an extruded thermoplastic resin foam which is produced by adding a nitrile resin or a vinyl alcohol resin to a polystyrene resin, and by using a blowing agent containing isobutane. JP-A-2006-131719 and 2006-131757 are the technology of maintaining the heat insulating property of a heat insulation foam board, and the technology of inhibiting the dissipation of a blowing agent having low thermal conductivity such as isobutane from the foam, by mixing a well-known gas barrier resin including a nitrile resin and a vinyl alcohol resin to a polystyrene resin blowing Further, JP-A-2002-144497 discloses a technology of inhibiting the dissipation of a physical blowing agent from an extruded thermoplastic resin foam by coating the surface of the extruded thermoplastic resin foam with gas barrier coating film of a non-halogen within a month after manufacturing the extruded polystyrene resin foam. According to this method, however, there is a problem in that the heat insulating property cannot be maintained once the coating film is damaged during the cutting process of a heat insulation foam board or the installment of an extruded thermoplastic resin foam using such as nail, and thus practical value is not high because a special apparatus is required for the manufacture.

Meanwhile, JP-A-2000-136258 discloses a foam sheet obtained by extruding and foaming a mixture of polystyrene resin and polyester resin.

The foam sheet disclosed in JP-A-2000-136258 is a foam sheet for thermal molding which can be molded into a dish, a bowie, and the like. As such, thickness of the foam sheet is thin, and expansion ratio is small. In other words, the foam sheet is different from the foam of the present invention which is thick, board-like, and has high expansion ratio for the purpose of maintaining the heat insulating property for a long period of time. With regard to the foam sheet disclosed in JP-A-2000-136258, the reason for mixing a polyester resin with a polystyrene resin is only to improve the oil resistance of a polystyrene resin foam sheet. In addition, it is well known that an extruded heat insulation foam having a large thickness and high expansion ratio cannot be easily obtained by simple mixing of a polystyrene resin with a polyester resin.

SUMMARY OF THE INVENTION

Object of the present invention is to provide an extruded thermoplastic resin foam having a low thermal conductivity and an excellent heat insulating property for a long period of time, wherein the foam has favorable gas barrier performance with inhibited dissipation of a physical blowing agent such as HCs from the foam and inhibited incorporation of air into the foam, and the foam has a large thickness and a high expansion ratio.

The inventors of the present invention studied extensively about an extruded thermoplastic resin foam (herein after, sometimes referred to as "heat insulation foam" or simply as "foam") having a low thermal conductivity and an excellent heat insulating property for a long period of time, wherein dissipation of a blowing agent from the foam is inhibited even in the case of using a physical blowing agent such as HC being zero (0) or extremely low in ozone depletion potential and being low in global warming potential.

The inventors also studied the extrusion-blowing technology using a mixture of polystyrene resin and crystalline polyester resin such as polyethylene terephthalate as a base resin. As a result, it was found that, since the crystallization temperature of a polyester resin is higher than the extruding and foaming temperature of a polystyrene resin and also the crystallization rate of polyester resin is faster than that of polystyrene resin, crystallization of a polyester resin occurs in an extruder when a base resin is melt/mixed and cooled to foaming temperature, and as a result crystallization of the polyester resin in an extruder causes deterioration in foamability and moldability which is necessary for obtaining a heat insulation foam having a large thickness and high expansion ratio.

As a result of further extensive studies, it was also found that, by using a mixture of polystyrene resin and non-crystalline or low-crystalline polyester resin as a base resin, deterioration in foamability and moldability can be avoided, and therefore a foam having a large thickness and high expansion ratio can be obtained. Furthermore, even by using a non-crystalline or low-crystalline polyester resin, that is not regarded as a gas barrier resin according to the gas permeation data of a film, it is unexpectedly found that the heat insulation foam using such base resin contributes favorably gas barrier performance to prevent dissipation of a physical blowing agent such as HCs from the foam and incorporation of air into the foam, thus leading to the completion of the invention.

The present invention is (1) An extruded thermoplastic resin foam having an apparent density of 20 to 50 kg/m$^3$, a closed cells ratio of 85% or more and a thickness of 10 to 150 mm, and containing a non-halogen organic physical blowing agent, wherein the thermoplastic resin composing the extruded foam contains a mixture of 100 parts by weight of a polystyrene resin (A) and 5 to 150 parts by weight of a polyester resin (B), and an endothermic calorific value of the polyester resin (B) less than 5 J/g (including 0) for fusion of the polyester resin on a DSC curve obtained by heat flux differential scanning calorimetry based on JIS K7122 (1987).

(2) The extruded thermoplastic resin foam according to above (1), wherein the thermoplastic resin is composed of a mixture of 100 parts by weight of the polystyrene resin (A) and 10 to 130 parts by weight of the polyester resin (B).

(3) The extruded thermoplastic resin foam according to above (1), wherein the polyester resin (B) is a non-crystalline.

(4) The extruded thermoplastic resin foam according to above (1), wherein the polyester resin (B) is a polyester copolymer containing a diol component and a dicarboxylic acid component, and the diol component contains 10 to 80 mol % of sprioglycol component in the entire diol components.

(5) The extruded thermoplastic resin foam according to above (1), wherein the polyester resin (B) is a polyester copolymer containing a diol component and a dicarboxylic acid component, and the diol component contains 10 to 40 mol % of neopentyl glycol component in the entire diol components.

(6) The extruded thermoplastic resin foam according to above (1), wherein the polyester resin (B) is a polyester copolymer containing a diol component and a dicarboxylic acid component, and the diol component contains 25 to 60 mol-% of 1,4-cyclohexanedimethanol component in the entire diol components.

(7) The extruded thermoplastic resin foam according to above (1), wherein the polyester resin (B) is a polyester copolymer containing a diol component and a dicarboxylic acid component, and the dicarboxylic acid component contains an aromatic dicarboxylic acid or an alkyl ester thereof.

(8) The extruded thermoplastic resin foam according to above (7), wherein the dicarboxylic acid component is dimethyl terephthalate.

(9) The extruded thermoplastic resin foam according to above (1), wherein the melt viscosity ($\eta$) of the polyester resin (B) is within the range of 1000 to 6000 Pa·s under the condition including a temperature of 200° C. and a shear rate of 100 sec$^{-1}$.

(10) The extruded thermoplastic resin foam according to above (1), wherein an sea-island structure is formed in a cross section of the cell membrane of the extruded thermoplastic resin foam so that the polystyrene resin (A) forms a continuous phase and the polyester resin (3) forms a dispersion phase.

(11) The extruded thermoplastic resin foam according to above (1), wherein the non-halogen organic physical blowing agent is a mixture blowing agent composed of at least one selected from normal butane, isobutane, normal pentane, isopentane, and cyclopentane and at least one selected from methyl chloride, methyl formate, dimethyl ether, methanol, ethanol, carbon dioxide, and water.

(12) The extruded thermoplastic resin foam according to above (1), wherein the amount of the non-halogen organic physical blowing agent remaining in the extruded thermoplastic resin foam is 0.1 to 0.9 mol with reference to 1 kg of the extruded thermoplastic resin foam at 100 days after the manufacture.

(13) The extruded thermoplastic resin foam according to above (1), wherein the thermal conductivity of the extruded thermoplastic resin foam is 0.029 W/(m·K) or less.

Effects of the Invention

The extruded thermoplastic resin foam, that is, the heat insulation foam of the present invention obtained by extruding a base resin in which the polystyrene resin (A) is mixed with the specific polyester resin (B), and as stable extrusion foaming can be performed and a ripple pattern is absent on the surface of the foam, the heat insulation foam of the present invention has good appearance. It is also the heat insulation foam of the present invention has sufficient thickness, high expansion ratio and has high closed cell ratio.

According to the heat insulation foam, of the present invention, as the polystyrene resin (A) is mixed with a specific amount of the non-crystalline or low-crystalline polyester resin (B), dissipation of an organic physical blowing agent such as HCs from the foam and incorporation of air into the foam can be controlled sufficiently. Consequently, thermal conductivity is low and excellent heat insulating property can be maintained for a long period of times even without using blowing agents containing freons. Thus, as a technology of conserving energy and adapting to the environment, it is useful as a heat insulating material for construction, and engineering materials.

In addition, as the polyester resin (B) prepared by a polyester copolymer containing a diol component and a dicarboxylic acid component, and the diol component contains a specific amount of glycol having cyclic ethers, the foam with particularly excellent heat resistance is obtained. This foam is suitable as the heat insulating material for external heat insulation such as roof or external wall which requires dimensional stability at high temperature.

Further, as the polyester resin (B) prepared by a polyester copolymer containing a diol component and a dicarboxylic acid component, and the diol component contains a specific amount of neopentyl glycol, or 1,3-, 1,4-, or 1,6-cyclohexanedimethanol, the thermoplastic base resin composed of the foam can have excellent gas barrier performance, in particular. Accordingly, the extruded thermoplastic resin foam can be a heat insulating material which exhibits more excellent long-term heat insulating property.

The extruded thermoplastic resin foam of the present invention has, in a cross section of the cell membrane, a sea-island structure in which the polystyrene resin (A) forms a continuous phase (matrix) and the polyester resin (B) forms a dispersion phase (domain). Thus, the polyester resin (B) is well dispersed to contribute to improve the gas barrier performance. Consequently, the extruded thermoplastic resin foam can exhibit particularly excellent long-term heat insulating property.

BRIEF DESCRIPTION OF THE DRAWINGS

In FIG. 1, a reference numeral 1 represents a cell membrane, a reference numeral 2 represents the polystyrene resin (A), and a reference numeral 3 represents the polyester resin (B).

DESCRIPTION OF PREFERRED EMBODIMENTS

Figure 1:
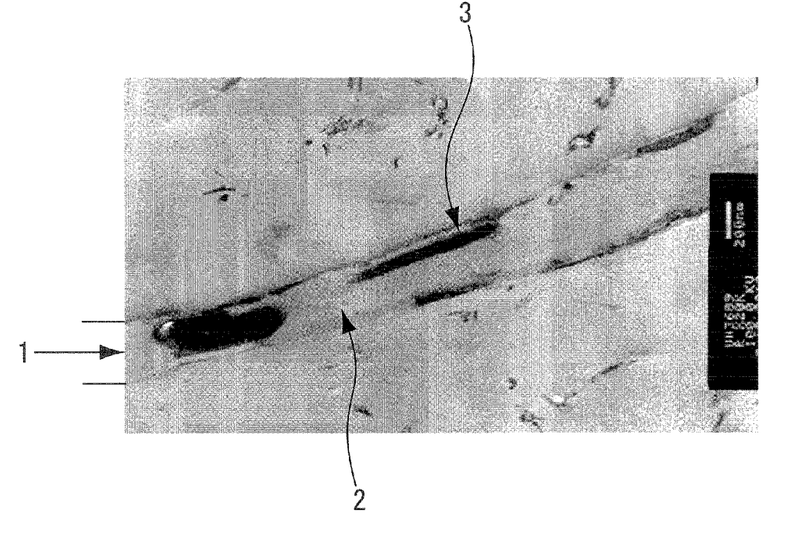
FIG. 1 is an example illustrating the extruded thermoplastic resin foam of the present invention which has, in a cross section of the cell membrane, a sea-island structure in which the polystyrene resin (A) forms a continuous phase (i.e., sea) and the polyester resin (B) forms a dispersion phase (i.e., island), and it is an transmission electron microscopic image showing part of the cross section of the cell membrane in the extruded foam that is obtained from Example 10 (magnification ratio: ×40,000).

The extruded thermoplastic resin foam of the present invention is composed of, as a base resin, a mixture of the polystyrene resin (A) and the non-crystalline or low-crystalline polyester resin (B) (herein after, sometimes described simply as "polyester resin (B)"). The extruded thermoplastic resin foam has, in a cross section of the cell membrane, a sea-island structure in which one of the polystyrene resin (A) and the polyester resin (B) forms a continuous phase, and the other forms a dispersion phase in the continuous phase. In particular, when the dispersion phase foams a layer in the continuous phase, is achieved a more improved long-term heat insulating property. And, the extruded thermoplastic resin foam of the present invention having high expansion ratio and a large thickness preferably has a sea-island structure in which the polystyrene resin (A) forms a continuous phase (matrix) and the polyester resin (B) forms a dispersion phase (domain). However, not necessarily having a sea-island structure, the extruded thermoplastic resin foam of the present invention can provide a long-term heat insulating property even when the polystyrene resin (A) and the polyester resin (B) together form a continuous phase and are dispersed in the form of a layer shown in FIG. 1.

Further, for obtaining the extruded thermoplastic resin foam having, in a cross section of the cell membrane, a dispersion phase in the form of a layer, it is preferable that the polyester resin (B) has good compatibility with the polystyrene resin (A) and the both resins have similar melt viscosity to each other and the production is carried out to obtain high expansion ratio in the range of apparent density of 20 to 50 kg/m$^3$.

When the thermal conductivity of the polystyrene resin (A) is compared with that of the non-crystalline or low-crystalline polyester resin (B), both in a non-foam state, i.e., polymer, the polyester resin (B) generally has higher thermal conductivity than the polystyrene resin (A). Thus, according to mixing the polystyrene resin (A) with the polyester resin (B), a mixture can have higher thermal conductivity than that of the polystyrene resin alone.

However, when a foam prepared by the polystyrene resin (A) only is compared to a foam prepared by a base resin in which the polystyrene resin (A) is mixed with the polyester resin (B), the foam prepared by a base resin in which the polystyrene resin (A) is mixed with the polyester resin (B) has lower thermal conductivity. Further, the thermal conductivity of a foam tends to decrease as the content of the polyester resin (B) in the base resin increases, and it is one of the characteristic effects of the present invention.

The reason why the foam prepared by a base resin mixed with the non-crystalline or low-crystalline polyester resin (B) has lower thermal conductivity compared with the foam prepared by a polystyrene resin only remains uncertain. It is presumably believed that, as the absorption band of the polyester resin (B) is added to the infrared absorption band of the polystyrene resin, i.e., the infrared absorption band is broadened, the base resin mixed with the polyester resin (B) can absorb more infrared light.

In a non-foam resin in a solid state, a heat is generally transmitted into a solid by thermal conduction. As such, thermal conductivity of a non-foam resin is influenced mostly by the thermal conductivity of a resin itself. On the other hand, in the foam, heat is transmitted not only by thermal conduction of a resin itself but also by thermal conduction of a gas present in cells in the foam (i.e., remaining blowing agent and atmospheric component) and convection of the gas in the cells. In addition, as the cells are superimposed to each other to form the foam, heat can be also transmitted via infrared radiation between cell membranes. It is presumed that, in the foam prepared by a base resin in which the polystyrene resin (A) is mixed with the polyester resin (B), heat insulating property of the foam is improved by decreasing thermal conduction by radiation, which is caused by the infrared absorption of the non-crystalline or low-crystalline polyester resin (B).

Further, when the polystyrene resin (A) is mixed with the polyester resin (B), the foam occurs white turbidity as the refractive index of the polystyrene resin (A) is different from that of the polyester resin (B) and the mixture is not fully solubilized. The white turbidity has an effect on the infrared-range absorption of the foam. It is also presumed that the heat-insulating property is improved only for the foam causing diffused reflection of infrared rays, yielding reduced thermal conduction by radiation and causing decreased thermal conductivity of the foam.

(1) Base Resin

The base resin composing the extruded thermoplastic resin foam, i.e. heat insulation foam of the present invention is a mixture resin containing the polystyrene resin (A) and the non-crystalline or low-crystalline polyester resin (B). Content of the polyester resin (B) in the base resin is 5 to 150 parts by weight with reference to 100 parts by weight of the polystyrene resin (A). Preferably, it is 10 to 130 parts by weight, and more preferably 20 to 100 parts by weight.

The present invention features use of a base resin having the polystyrene resin (A) mixed with the non-crystalline or low-crystalline polyester resin (B).

As is generally known, gas permeation rate of a non-crystalline or low-crystalline polyester resin for oxygen, nitrogen, hydrocarbon, and the like is several times higher than that of a crystalline polyester resin. In addition, an effect of improving gas barrier performance by stretching a polyester resin is hardly expected. Thus, it would have been impossible to consider that the mixing of the polystyrene resin (A) with the non-crystalline or low-crystalline polyester resin (B) is effective for inhibiting dissipation of a blowing agent from a foam and incorporation of air into the foam, and that is the object of the present invention. When extrusion-foaming is carried out by using as a base resin the mixture of the polystyrene resin (A) and crystalline polyethylene terephthalate, which is a representative polyester resin, the stable extrusion-foaming cannot be performed, and further, a resulting foam has poor mechanical strength or low percentage of closed cells.

However, when a base resin in which the polystyrene resin (A) is mixed with the non-crystalline or low-crystalline polyester resin (B), is used, a favorable extruded thermoplastic resin foam having a large thickness and high expansion ratio can be stably produced without causing any deterioration in foamability and moldability as described. In addition, the foam obtained by using a base resin of the polystyrene resin (A) and the polyester resin (B) exhibits sufficient gas barrier performance as the dissipation of a blowing agent from the foam and the incorporation of air into the foam are controlled sufficiently. Although it remains uncertain why the gas barrier performance is exhibited, it is considered that, as the polystyrene resin (A) and the polyester resin (B) can be mixed with each other, the polyester resin (B) is dispersed finely in the polystyrene resin, and thus the resultant foam has an effect of blocking gas permeation. This is also supported by exhibition of particularly excellent gas barrier performance when the dispersion state of the polystyrene resin (A) and the polyester resin (B) in a cross section of the cell membrane composing the extruded thermoplastic resin foam has either a sea-island type dispersion structure or a layer type dispersion structure.

(i) Polystyrene Resin (A)

Examples of the polystyrene resin (A) used in the present invention include a styrene homopolymer and a styrene-acrylic acid ester copolymer, a styrene-methacrylic acid ester copolymer, a styrene-acrylic acid copolymer, a styrene-methacrylic acid copolymer, a styrene-maleic anhydride copolymer, a styrene-polyphenylene ether copolymer, a styrene-butadiene copolymer, a styrene-acrylonitrile copolymer, an acrylonitrile-butadiene-styrene copolymer, an acrylonitrile-styreneacrylate copolymer, a styrene-methylstyrene copolymer, a styrene-dimethylstyrene copolymer, a styrene-ethylstyrene copolymer, a styrene-diethylstyrene copolymer, a high impact polystyrene, and the like, which contain styrene component as a main component. It can be used either singly or in combination of two or more. Further, the content of the styrene component in the above styrene copolymer is preferably 50 mol % or more, and more preferably 80 mol % or more.

Among the polystyrene resins described above, a styrene homopolymer, a styrene-acrylic acid ester copolymer, a styrene-methacrylic acid ester copolymer, a styrene-acrylic acid copolymer, a styrene-methacrylic acid copolymer, a styrene-maleic anhydride copolymer, a styrene-polyphenylene ether copolymer, a styrene-acrylonitrile copolymer, and a styrene-methylstyrene copolymer are preferable. Further, a styrene homopolymer, a styrene-methacrylic acid ester copolymer, and a styrene-acrylic acid ester copolymer are more preferable.

The polystyrene resin (A) used in the present invention has melt viscosity ($\eta$) of 500 to 10000 Pa·s, preferably 700 to 8000 Pa·s, and more preferably 1000 to 6000 Pa·s under the condition including the temperature of 200° C. and shear rate of 100 sec$^{-1}$. As having the melt viscosity ($\eta$) of the polystyrene resin (A) in the above range, foamability and moldability becomes excellent when an extruded thermoplastic resin foam is produced, and also the resulting extruded thermoplastic resin foam has excellent mechanical strength. In addition, it is also preferable from the viewpoint of having excellent mixing property with the polyester resin (B), and the mixture of the polystyrene resin (A) and the polyester resin (B), which composes the foam, can exhibit more favorable gas barrier performance.

(ii) Polyester Resin (B)(Non-Crystalline or Low-Crystalline Polyester Resin)

The polyester resin (B) used in the present invention is made of a polyester copolymer which contains a diol component and a dicarboxylic acid component. Examples of the polyester resin (B) include a polyester copolymer which is produced by a method of polycondensing the diol component and dicarboxylic acid component, an ester exchange reaction of a polyester homopolymer and/or a polyester copolymer, or the like.

Detailed explanation is given to the dicarboxylic acid component of the polyester resin (B) used in the present invention. As a dicarboxylic acid component, dicarboxylic acid or its ester-forming derivatives may be used. Examples of the ester-forming derivatives include an ester derivative such as lower alkyl ester having 1 to 4 carbon atoms, a salt such as diammonium salt, and an acid halide such as dichloride. Examples of the dicarboxylic acid component unit in the polyester resin (B) include aromatic dicarboxylic acid such as terephthalic acid, isophthalic acid, 2,6-naphthalene dicarboxylic acid, phthalic acid, 4,4'-diphenyl dicarboxylic acid, 3,4'-diphenyl dicarboxylic acid, 1,4-naphthalene dicarboxylic acid, 1,5-naphthalene dicarboxylic acid, 2,5-naphthalene dicarboxylic acid, and 2,7-naphthalene dicarboxylic acid, or their derivatives such as acid anhydride; aliphatic dicarboxylic acid such as oxalic acid, succinic acid, adipic acid, sebacic acid, and dodecanedionic acid, or their derivatives; or alicyclic dicarboxylic acid such as 1,4-cyclohexanedicarboxylic acid, 1,3-cyclohexanedicarboxylic acid, decaline dicarboxylic acid, and tetraline dicarboxylic acid, or their derivatives. The dicarboxylic acid component can be used either singly or in combination of two or more.

The polyester resin (B) of the present invention preferably contains an acid component unit having aromatic dicarboxylic acid or acid anhydride thereof, or derivatives thereof as a main dicarboxylic acid component unit. For example, it is preferable to contain at least one dicarboxylic acid component of terephthalic acid component unit, isophthalic acid component unit, and naphthalene dicarboxylic acid component unit. In particular, the terephthalic acid component unit contains terephthalate and dimethyl terephthalate.

The diol component of the polyester resin (B) used in the present invention is explained in greater detail herein below.

As a diol component, aliphatic, alicyclic or aromatic dial, or diol containing cyclic ether structure (including divalent phenol), or their ester-forming derivatives may be used. Examples of the diol component unit in the polyester resin include aliphatic diol such as ethylene glycol, propylene glycol, trimethylene glycol, diethylene glycol, 1,4-butanediol, and neopentyl glycol; alicyclic diol such as 1,4-cyclohexanedimethanol, 1,3-cyclohexanedimethanol, and 1,6-cyclohexanediol; aromatic dial such as bisphenol A; and diol having a cyclic ether such as 3,9-bis(1,1-dimethyl-2-hydroxyethyl) 2,4,8,10-tetraoxaspiro[5.5]undecane (hereinafter, referred to as spiroglycol). The diol component can be used either singly or in combination of two or more.

As a main diol component unit, the polyester resin (B) preferably contains at least one of alicyclic diol component unit such as cyclohexanedimethanol, neopentyl glycol component unit, and a dial component unit having cyclic ether structure of spiroglycol. The dial component is preferably contained in an amount of 10 mol % or more, and more preferably 10 to 80 mol % in the entire dial components.

Further, when a diol component unit having a cyclic ether structure of spiroglycol or a component unit derived from alicyclic dial such as cyclohexane dimethanol is contained as a diol component, heat resistance of the extruded thermoplastic resin foam to be obtained can be improved.

When the spiroglycol component unit is contained as a diol component of the polyester resin (B), it is preferably contained in an amount of 10 to 80 mol %, or more preferably 10 to 60 mol % in the entire dial components. When an alicyclic diol component unit such as cyclohexanedimethanol is contained as a dial component of the polyester resin (B), it is preferably contained in an amount of 25 to 60 mol % in the entire dial components.

When having a neopentyl glycol component unit is contained as a dial component, gas barrier performance of the extruded thermoplastic resin foam can be improved. When a neopentyl glycol component unit is contained as a diol component of the polyester resin (B), it is contained in an amount of 10 to 40 mol %, and preferably 20 to 40 mol % in the entire diol components.

Regarding the polyester resin (B) of the present invention, its molecular terminal may be sealed with a small amount of a component unit that is derived from a monofunctional compound such as benzoic acid, benzoyl benzoic acid, and methoxypolyethylene glycol. In addition, it may contain a small amount of a component unit derived from a polyfunctional compound such as pyromellitic acid, trimellitic acid, trimeric acid, glycerin, and pentaerythritol.

Crystallinity of the polyester resin (B) can be adjusted by a method of changing mole ratio of dicarboxylic acid component units using two or more components such as terephthalic acid and isophthalic acid as a dicarboxylic acid component, or a method of changing mole ratio of diol component units using two or more components such as ethylene glycol and cyclohexanedimethanol as a diol component.

The non-crystalline or low-crystalline polyester resin (B) used in the present invention satisfies the requirement that endothermic peak calorific value is less than 5 J/g (including j) for fusion of a resin on a DSC (differential scanning calorimetry) curve obtained by heat flux differential scanning calorimetry (herein after, referred to as a "DSC instrument") employing the "case of determining heat of fusion after performing a certain heat treatment" based on JIS K7122 (1987) (heating rate and cooling rate for controlling the state of a test sample are all 10° C./min, and the test sample is heated up to temperature of melting point +30° C., in case that the test sample has no melting point, the test sample is heated up to 300° C.), and by rising the temperature with heating rate of 10° C./min.

In addition, the endothermic peak calorific value of the polyester resin is more preferably less than 2 J/g (including 0) in terms of foamability of a mixture containing the polystyrene resin (A) and the polyester resin (B).

To have the dispersion phase, preferably dispersed in the form of a layer, in a cross section of the cell membrane of the extruded thermoplastic resin foam of the present invention, it is preferable that the melt viscosity (η) of the polyester resin (B) is close to that of the polystyrene resin (A) as much as possible. The melt viscosity (η) is preferably in the range of 500 to 10000 Pa·s, more preferably 700 to 8000 Pa·s, and still more preferably 1000 to 6000 Pa·s under the condition including the temperature of 200° C. and the shear rate of 100 sec$^{-1}$.

The mixing amount of the polyester resin (B) in the base resin composing the extruded thermoplastic resin foam of the present invention is, with reference to 100 parts by weight of the polystyrene resin (A), 5 to 150 parts by weight, preferably 10 to 130 parts by weight, and more preferably 20 to 100 parts by weight. If the mixing amount of the polyester resin (B) is too small, the effect of improving the gas barrier performance of the extruded thermoplastic resin foam is lowered. On the other hand, if the mixing amount of the polyester resin (B) is too large, the melt tension of mixture with the polystyrene resin (A) and the polyester resin (B) is reduced, thus it becomes difficult to achieve the foamability and moldability. There is also concern that the extruded thermoplastic resin foam having high expansion ratio and high percentage of closed cells might not be obtained in such case. Further, even though it may depend on the type of the polyester resin (B) used, there is concern that the heat resistance of the extruded thermoplastic resin foam to be obtained is deteriorated compared with a conventional ordinary polystyrene resin foam.

Within the range that the object of the present invention is not impaired, other polymer such as polyolefin resin, styrenic elastomer, or polyphenylene ether resin may be mixed and used in the base resin depending on the purpose of mixing the other polymer. The upper limit of the amount of the other polymer is preferably 30% by weight in the base resin. It is more preferably 20% by weight or less and still more preferably 10% by weight or less.

(2) Physical Blowing Agent (C)

In the present invention, the physical blowing agent (C) is used for extrusion-foaming of the extruded thermoplastic resin foam, and the blowing agent (C) contains at least a non-halogen organic physical blowing agent as one component of the physical blowing agents for the purpose of not using a physical blowing agent containing freons or reducing the amount thereof. In addition, it is preferable that the physical blowing agent (C) has zero or extremely low ozone depletion potential and also low global warming potential. Meanwhile, with regard to the physical blowing agent (C), considering the long-term heat insulating property of an extruded thermoplastic resin foam, it preferably contains 10 mol % or more (including 100 mol %), and more preferably 20 mol % or more (including 100 mol %) of a physical blowing agent which can easily remain in the extruded thermoplastic resin foam. As a physical blowing agent which can easily remains in the extruded thermoplastic resin foam, hydrocarbon-based physical blowing agent (C1) which has relatively slow gas permeation rate against the polystyrene resin may be suitably used. Further, since the base resin of the present invention is based on the mixture of the polystyrene resin (A) and the polyester resin (B), the gas barrier performance is improved. As such, the gas permeation rate of the physical blowing agent (C1) against the base resin is further reduced, and as a result, the heat insulating property of the extruded thermoplastic resin foam is further improved.

Examples of the hydrocarbon-based physical blowing agent (C1) which has relatively slow gas permeation rate against the polystyrene resin described above, include an aliphatic hydrocarbon having 3 to 5 carbon atoms such as propane, normal butane, isobutane, normal pentane, isopentane, and neopentane; and an alicyclic hydrocarbon having 3 to 6 carbon atoms, such as cyclobutane, cyclopentane, and cyclohexane. This physical blowing agent (C1) can be used either singly or in combination of two or more. Among them, normal butane, isobutane, normal pentane, isopentane, and cyclopentane, which have slow gas permeation rate and is suitable as a blowing agent, are preferable. Isobutane is more preferable.

Meanwhile, examples of the physical blowing agent (C2) which can be used in combination with the physical blowing agent (C1) and has relatively fast gas permeation rate include alkyl chlorides, alcohols, ethers, ketones, methyl formate, carbon dioxide and water. Among these blowing agents (C2), alkyl chlorides having 1 to 3 carbon atoms, aliphatic alcohols having 1 to 4 carbon atoms, ethers with an alkyl chain having 1 to 3 carbon atoms, carbon dioxide, water and the like are preferred as the physical blowing agent (C2). Examples of the alkyl chlorides having 1 to 3 carbon atoms include methyl chloride, ethyl chloride and the like. Examples of the aliphatic alcohols having 1 to 4 carbon atoms include methanol, ethanol, propyl alcohol, isopropyl alcohol, butyl alcohol, sec-butyl alcohol, tert-butyl alcohol, aryl alcohol, crotyl alcohol, propargyl alcohol and the like. Examples of the ethers with an alkyl chain having 1 to 3 carbon atoms include dimethyl ether, ethyl methyl ether, diethyl ether, methylene dimethyl ether and the like. In particular, with methyl chloride, dimethyl ether, methanol, ethanol, carbon dioxide, and water, an effect of improving expansion ratio is expected. The physical blowing agent (C2) can be used either singly or in combination of two or more.

In the present invention, the physical blowing agent (C) is preferably a mixture blowing agent which contains at least one physical blowing agent (C1) of normal butane, isobutane, normal pentane, isopentane, and cyclopentane having relatively slow gas permeation rate, and at least one of physical blowing agent (C2) of methyl chloride, dimethyl ether, methanol, ethanol, and carbon dioxide having relatively fast gas permeation rate and high effect of improving expansion ratio.

As the physical blowing agent described above is an excellent blowing agent, it has an effect of lowering the apparent density of the extruded thermoplastic resin foam to be obtained. Further, the physical blowing agent (C1) has an effect of maintaining the heat insulating property for a long time. Further, the physical blowing agent (C2) has an effect of quickly stabilizing the heat insulating property and flame retardancy of the heat insulation foam, as the physical blowing agent (C2) can dissipate early from the extruded thermoplastic resin foam. Further, by using carbon dioxide, size of the cells in the extruded thermoplastic resin foam is reduced, thus an effect of reducing the addition amount of cell controlling agent or an effect of improving the heat insulating property is expected, and therefore it is desirable.

Further, from the viewpoint of improving the safety at the time of manufacture of the extruded thermoplastic resin foam or the flame retardancy of the heat insulation foam, it is preferable to use, as the physical blowing agent (C) a mixture blowing agent in which the hydrocarbon-based physical blowing agent (C1) having relatively slow gas permeation rate described above is contained in combination with the physical blowing agent (C2) having relatively fast gas permeation rate described above. By using the mixture blowing agent, the extruded thermoplastic resin foam having sufficient expansion ratio can be obtained by the physical blowing agent (C2) even when the addition amount of the physical blowing agent (C1) is reduced. In addition, as most of the physical blowing agent (C2) dissipates from the extruded thermoplastic resin foam right after the extrusion-foaming, the remaining amount of flammable gas in the extruded thermoplastic resin foam (i.e., physical blowing agent (C1)) can be reduced. Consequently, desired flame retardancy can be given to the extruded thermoplastic resin foam even when only a small amount of the flame retardant is used in the base resin. When the remaining amount of the flammable gas (physical blowing agent (C1)) is too little in the foam, the heat insulating property may be impaired.

The addition amount of the physical blowing agent in the base resin is appropriately selected in view of the desired expansion ratio. To obtain the extruded thermoplastic resin foam having apparent density of 20 to 50 kg/cm$^3$, the physical blowing agent is generally added in an amount of 0.5 to 3 moles with reference to 1 kg of the base resin. Preferably, it is added in an amount of 0.6 to 2.5 moles.

(3) Flame Retardant

The extruded thermoplastic resin foam obtained according to the present invention is used mainly as a constructional heat insulation board. Thus, high flame retardancy satisfying the flammability defined in "Measurement method A" of JIS A9511 (2006) 5.13.1 for an extruded polystyrene foam, is required for the extruded foam of the present invention. Further, it is preferable that the extruded thermoplastic resin foam of the present invention has the heat insulating property that satisfies the thermal conductivity defined in JIS A9511 (2006) 4. 2. Thus, the addition amount of the hydrocarbon-based physical blowing agent (C1) in the physical blowing agent (C) is preferably adjusted in response to the remaining amount of the physical blowing agent (C1) in the extruded thermoplastic resin foam that is necessary for satisfying both standards of the flame retardancy and the heat insulating property described above. Still further, the physical blowing agent (C2) is suitably decided depending on the amount of the physical blowing agent (C1) for obtaining the desired apparent density.

The extruded thermoplastic resin foam satisfying the flammability defined in "Measurement method A" of JIS A9511 (2006) 5.13.1 for an extruded polystyrene foam insulation board, and the high level of heat insulating property can be achieved by adding a flame retardant and by adding to the adjustment of the content of the physical blowing agent (C1) in the extruded thermoplastic resin foam.

As a flame retardant which can be used for the extruded thermoplastic resin foam of the present invention, bromine flame retardant is preferably used. Examples of the bromine flame retardant include tetrabromobisphenol A, tetrabromobisphenol A bis(2,3-dibromopropyl ether), tetrabromobisphenol A bis(2-bromoethyl ether), tetrabromobisphenol A bis(allyl ether), 2,2-bis[4-(2,3-dibromo-2-methylpropoxy)-3,5-dibromophenyl]propane, tetrabromobisphenol S, tetrabromobisphenol S-bis(2,3-dibromopropyl ether), hexabromocyclododecane, tetrabromocyclooctane, tris(2,3-dibromopropyl) isocyanurate, tribromophenol, decabromodiphenyl oxide, tris(tribromoneopentyl)phosphate, N-2,3-dibromopropyl-4,5-dibromohexahydrophthalimide, brominated polystyrene, brominated bisphenol ether derivative and the like. These compounds can be used either singly or in combination of two or more. Among the bromine flame retardants described above, as having high heat stability and high flame retardant effect, hexabromocyclododecane, tetrabromocyclooctane, tetrabromobisphenol A bis(2,3-dibromopropyl ether), 2,2-bis[4-(2,3-dibromo-2-methylpropoxy)-3,5-dibromophenyl]propane, and tris(2,3-dibromopropyl)isocyanurate are particularly preferable.

Content of the flame retardant in the extruded thermoplastic resin foam is, from the viewpoint of improving the flame retardancy and inhibiting the reduction in foamability and the reduction in mechanical strength, preferably 1 to 10 parts by weight, more preferably 1.5 to 7 parts by weight, and still more preferably 2 to 5 parts by weight with reference to 100 parts by weight of the base resin.

In the present invention, for the purpose of further improving the flame retardancy of the extruded thermoplastic resin foam, a flame retardant aid may be used in combination with the bromine flame retardant described above. Examples of the flame retardant aid include a diphenyl alkane and diphenyl alkene such as 2,3-dimethyl-2,3-diphenylbutane, 2,3-diethyl-2,3-diphenylbutane, 3,4-dimethyl-3,4-diphenylhexane, 3,4-diethyl-3,4-diphenylhexane, 2,4-diphenyl-4-methyl-1-pentene, and 2,4-diphenyl-4-ethyl-1-pentene; polyalkylated aromatic compounds such as poly-1,4-diisopropyl benzene; triphenylphosphate; cresyl-di-2,6-cresylphosphate; antimony trioxide; diantimony pentoxide; ammonium sulfate; zinc stannate; nitrogen-containing cyclic compounds such as cyanuric acid, isocyanuric acid, triallyl isocyanurate, melamine cyanurate, melamine, melam, and melem; inorganic compounds such as a silicon compounds, boron oxide, zinc borate, and zinc sulfide; and phosphorus compounds such as red phosphorus compounds, ammonium polyphosphate, phosphazen, and hyphophosphite. These compounds can be used either singly or in combination of two or more. The addition amount of the flame retardant aid is, in case of diphenyl alkane or diphenyl alkene, 0.05 to 1 parts by weight, and preferably 0.1 to 0.5 parts by weight with reference to 100 parts by weight of the base resin. For other flame retardant aid, it is 0.5 to 5 parts by weight, and preferably 1 to 4 parts by weight with reference to 100 parts by weight of the base resin.

(4) Agent for Improving Heat Insulating Property

In the present invention, the heat insulating property can be further improved by adding an agent for improving heat insulating property to the base resin. Examples of the agent for improving heat insulating property include metal oxides such as titanium oxide, metals such as aluminum, fine powder such as ceramic, carbon black, and graphite, infrared-blocking pigment, hydrotalcite, and the like. These can be used either singly or in combination of two or more. The addition amount of the agent for improving heat insulating property is 0.5 to 5 parts by weight, and preferably 1 to 4 parts by weight with reference to 100 parts by weight of the base resin.

(5) Other Additives

Depending on the requirement, various additives such as cell controlling agent, coloring agents including a dye and a pigment, heat-stabilizer, filler, and the like may be suitably mixed with the base resin. Examples of the cell controlling agent include inorganic powder such as talc, kaolin, mica, silica, calcium carbonate, barium sulfate, titanium oxide, aluminum oxide, clay, bentonite, and diatomaceous earth, and conventionally known chemical blowing agent such as azodicarbodiamide and the like. Among them, talc is suitable as it does not impair the flame retardancy and is useful for control of cell diameter.

In particular, talc having the particle diameter of 0.1 to 20 µm, furthermore, 0.5 to 15 as described in JIS Z8901 (2006), is preferable. The addition amount of the cell controlling agent is appropriately adjusted depending on the type of the cell controlling agent and the cell diameter of desired foam, and the like. However, with reference to 100 parts by weight of the base resin, it is approximately 0.01 to 8 parts by weight, preferably 0.01 to 5 parts by weight, and more preferably 0.05 to 3 parts by weight.

From the viewpoint of dispersibility of additives, the cell controlling agent and other additives are preferably added as a master batch. As an example of a master batch of the cell controlling agent, when talc is used as a cell controlling agent, the preparation is preferably carried out so as to obtain the talc content of 20 to 80% by weight, and more preferably 30 to 70% by weight with reference to the base resin.

The physical property of the extruded thermoplastic resin foam is explained in greater detail.

(i) Apparent Density

The extruded thermoplastic resin foam of the present invention has apparent density of 20 to 50 kg/cm$^3$. When the apparent density is too low, manufacturing the extruded thermoplastic resin foam itself is difficult, and the mechanical strength might of the foam be insufficient depending on use. On the other hand, when the apparent density is too high, it is difficult to obtain sufficient heat insulating property unless the extruded thermoplastic resin foam is prepared to be quite thick, and it is also undesirable in terms of having light-weightness.

(ii) Thickness

The extruded thermoplastic resin foam of the present invention preferably has a thickness of 10 to 150 mm in view of its use purpose. When the thickness is too thin, there is a concern that the heat insulating property that is required as a heat insulating material is insufficient. On the other hand, when the thickness is too thick, foamability and moldability is worse, even if it is variable depending on the size of an extruder. Further, the thickness of 15 to 120 mm is more preferable.

(iii) Average Cell Diameter

Average cell diameter in thickness direction of the extruded thermoplastic resin foam of the present invention is preferably 0.05 to 2 mm, more preferably 0.06 to 0.8 mm, and still more preferably 0.06 to 0.3 mm. By having the average cell diameter in thickness direction within the range described above and the apparent density of the above range, the infrared ray transmission in the foam can be inhibited. As a result, the extruded thermoplastic resin foam having better heat insulating property can be obtained.

Method of measuring the average cell diameter described in the specification is as follows.

For the average cell diameter in thickness direction of the extruded thermoplastic resin foam ($D_T$: mm) and the average cell diameter in width direction of an extruded thermoplastic resin foam ($D_W$: mm), microscopically enlarged image of vertical cross section of the extruded thermoplastic resin foam in width direction (i.e., vertical cross section which is perpendicular to the extrusion direction of the extruded thermoplastic resin foam) is prepared. Meanwhile, for the average cell diameter in extrusion direction of the extruded thermoplastic resin foam ($D_L$: mm), microscopically enlarged image of vertical cross section of the extruded thermoplastic resin foam in extrusion direction (i.e., vertical cross section which is parallel to the extrusion direction of the extruded thermoplastic resin foam and bisects the center part in the width direction) is prepared. Then, on the enlarged image, a straight line is drawn in desired measurement direction and the number of cells intersecting the straight line is counted. Subsequently, length of the straight line (herein, the length indicates the length of the straight line calibrated against the magnification ratio of the image, rather than the actual straight line shown in the enlarged image) is divided by the total number of the counted cells. According to this method, the average cell diameter is obtained for each direction.

Explaining in greater detail the method of measuring the average cell diameter, the average cell diameter in thickness direction ($D_T$: mm) is determined as follows. First, a microscopically enlarged image is obtained from three regions of the cross section in width direction, i.e., the center part and both terminal regions of the cross section. Then, on each image, a straight line is drawn in the thickness direction over the entire thickness part of the extruded thermoplastic resin foam and the average diameter of cells present on each straight line is obtained from the length of each straight line and the number of cells intersecting the straight line (i.e., length of the straight line/number of the cells intersecting the straight line). Thereafter, arithmetic mean of the average diameter obtained from the three regions is calculated as an average cell diameter in thickness direction ($D_T$: mm).

The average cell diameter in width direction ($D_W$: mm) is determined as follows. First, a microscopically enlarged image is obtained from three regions of the vertical cross section in width direction, i.e., the center part and both terminal regions of the vertical cross section. Then, on each image, a straight line is drawn in width direction at the position in which the extruded thermoplastic resin foam is bisected in thickness direction, wherein the straight line has the length of 3 mm×magnification ratio. Then, from the straight line and the number of cells intersecting the straight line, the average diameter of cells present on each straight line is obtained according to the equation (3 mm/(the number of cells intersecting the straight line−1)). Thereafter, arithmetic mean of the average diameter obtained from the three regions is calculated as an average cell diameter in width direction ($D_W$: mm).

The average cell diameter in extrusion direction ($D_L$: mm) is determined as follows. First, at the position of the extruded thermoplastic resin foam wherein the board is bisected in width direction, a microscopically enlarged image is obtained from three regions of the vertical cross section in extrusion direction, i.e., the center part and two terminal regions of the vertical cross section, wherein the vertical cross section is obtained by cutting the extruded thermoplastic resin foam in extrusion direction. Then, on each image, a straight line is drawn in extrusion direction at the position in which the extruded thermoplastic resin foam is bisected in thickness direction, wherein the straight line has the length of 3 mm×magnification ratio. Then, from the straight line and the number of cells intersecting the straight line, the average diameter of cells present on each straight line is obtained according to the equation (3 mm/(the number of cells intersecting the straight line−1)). Thereafter, arithmetic mean of the average diameter obtained from the three regions is calculated as an average cell diameter in extrusion direction ($D_L$: mm). In addition, the average cell diameter in parallel direction of the extruded thermoplastic resin foam ($D_H$: mm) is calculated as the arithmetic mean value of $D_W$ and $D_L$.

(iv) Cell Deformation Ratio

The extruded thermoplastic resin foam of the present invention preferably has cell deformation ratio of 0.7 to 2.0. The cell deformation ratio is a value obtained by dividing $D_T$ by $D_H$ ($D_T/D_H$) according to the measurement method described above. The smaller than 1 the cell deformation ratio is, the flatter the cell becomes. On the other hand, the greater than 1 the cell deformation ratio is, the longer vertically elongated the cell becomes. When the cell deformation is too small, the cell is flat, and therefore the compression strength might be impaired. Further, as a flat cell has a strong tendency of re-gaining a globular shape, dimensional stability of the extruded foam might be also poor. On other hand, when the cell deformation ratio is too high, the number of cells in width direction is reduced, thus an effect of improving a heat insulating property by cell shape is reduced. From this point of view, the cell deformation ratio is preferably 0.8 to 1.5, and more preferably 0.8 to 1.2. As having the cell deformation ratio in this range, the extruded thermoplastic resin foam having excellent mechanical strength and more improved heat insulating property is provided.

(v) Closed Cells Ratio

Closed cells ratio of the extruded thermoplastic resin foam is preferably 85% or more, more preferably 90% or more, and still more preferably 93% or more. The higher the percentage of closed cells is, the better the heat insulating property can be maintained. The percentage of closed cells S (%) is calculated according to the following equation (1) by using the true volume Vx of an extruded thermoplastic resin foam, that is measured by using Air Comparison Pycnometer (for example, TOSHIBA BECKMAN, Air Comparison Pycnometer, Model: 930) according to the procedure C defined in ASTM-D2856-70.

In the specification, the percentage of closed cells (closed cells ratio) of the extruded thermoplastic resin foam is calculated according to the following equation (1). From total of three regions including the center part and both terminal regions in width direction of the extruded thermoplastic resin foam, a cutting sample is cut out and each cutting sample is employed as a measurement sample. For each measurement sample, percentage of closed cells is measured and arithmetic mean of the percentage of closed cells for three regions is obtained. The cutting sample is a sample having no skin of the extruded thermoplastic resin foam, which is cut out from the extruded thermoplastic resin foam to have a size of 25 mm×25 mm×20 mm (length×width×thickness). When the foam is too thin to give a sample cut to have 20 mm in thickness direction, two pieces of a sample (i.e., cutting sample) cut to have a size of 25 mm×25 mm×10 mm (length×width×thickness) are overlaid to each other and measured.

$$S(\%)=(Vx-W/\rho)\times 100/(VA-W/\rho) \qquad (1)$$

With the proviso that,

Vx: True volume ($cm^3$) of a cutting sample that is obtained from the measurement using Air Comparison Pycnometer described above (it corresponds to the sum of the resin volume composing the cutting sample of extruded thermoplastic resin foam and the entire volume of the closed cells contained in the cutting sample).

VA: Apparent volume ($cm^3$) of the cutting sample that is calculated from the outer dimension of the cutting sample used for the measurement W: total weight (g) of the cutting sample used for the measurement $\rho$: density ($g/cm^3$) of the resin composing the extruded thermoplastic resin foam (vi) Thermal Conductivity Thermal conductivity of the extruded thermoplastic resin foam is preferably 0.029 W/(m·K) or less. According to the present invention, the thermal conductivity is measured by cutting a test sample having no skin of the extruded thermoplastic resin foam from the extruded thermoplastic resin foam to have a size of 200 mm×200 mm×25 mm (length×width× thickness), and measuring the thermal conductivity of the test sample according to the flat heat flow meter method described in JIS A 1412-2 (1999) (i.e., two heat flow meter system, higher temperature side; 38° C., lower temperature side; 8° C., and average temperature; 23° C.). Further, when a test sample cannot be cut to have thickness of 25 mm, several pieces (as few as possible) of the thin test sample are overlaid to one another to give a test sample having thickness of 25 mm.

(vii) Remaining Amount of Physical Blowing Agent

In the extruded thermoplastic resin foam of the present invention, to have an excellent heat insulating property within the range that flame retardancy is not impaired, the remaining amount of a hydrocarbon organic physical blowing agent in the foam at 100 days after the manufacture of the extruded thermoplastic resin foam is preferably 0.1 to 0.9 mol, and more preferably 0.4 to 0.9 mol per kg of the extruded thermoplastic resin foam. In the specification, the remaining amount of a hydrocarbon organic physical blowing agent in the foam is measured by internal standard method using gas chromatography. Specifically, a suitable amount of sample is cut out from the extruded thermoplastic resin foam and added into a sample bottle having a cap in which a suitable amount of toluene and an internal standard material are contained. After closing the bottle, it is thoroughly stirred to dissolve the physical blowing agent contained in the extruded thermoplastic resin foam into toluene. The dissolved solution, which is a measurement sample, is subjected to gas chromatography analysis, and the remaining amount of the physical blowing agent in the foam is obtained.

EXAMPLES

Herein below, the present invention is explained specifically in view of the Examples and the Comparative examples. However, the present invention is not limited by these Examples.

(1) Raw materials used for the base resin of the Examples and the Comparative examples are described below.

(i) Base Resin

The polystyrene resin and the polyester resin, both composing the base resin, are described in Table 1 and Table 2, respectively.

TABLE 1

| Abbreviation | Type | Maker | Product No. | Melt viscosity (Pa · s) (200° C., 100 s$^{-1}$) |
|---|---|---|---|---|
| PS1 | Styrene homopolymer | PS JAPAN CORP. | HH32 | 1630 |
| PS2 | Styrene homopolymer | PS JAPAN CORP. | 679 | 670 |
| Heat Resistant PS | Styrene-methacrylic acid copolymer | PS JAPAN CORP. | G9001 | 1960 |

TABLE 2

| Abbreviation | Maker | Product name | Composition Dicarboxylic acid component (mole ratio) | Composition Glycol component (mole ratio) | endothermic peak calorific value (J/g) | Melt viscosity (Pa · s) (200° C., 100 s$^{-1}$) |
|---|---|---|---|---|---|---|
| PETG | Eastman Chemical Company | EASTER GN001 | DMT = 100 | CHDM/EG = 33/67 | 0 | 3850 |
| PETN | TOYOBO Co., Ltd. | VYLON Si173 | DMT = 100 | NPG/EG = 30/70 | 0 | 3440 |
| S20 | Mitsubishi Gas Chemical Company, Inc. | ALTESTER20 | DMT = 100 | SPG/EG = 20/80 | 0 | 3020 |
| S30 | Mitsubishi Gas Chemical Company, Inc. | ALTESTER30 | DMT = 100 | SPG/EG = 30/70 | 0 | 3440 |
| S45 | Mitsubishi Gas Chemical Company, Inc. | ALTESTER45 | DMT = 100 | SPG/EG = 45/55 | 0 | 5560 |
| PET | Mitsubishi Chemical Corp. | NOVAPEX GS900Z | DMT = 100 | EG = 100 | 45 | Impossible to measure |

DMT: dimethyl terephthalate
EG: ethylene glycol
CHDM: 1,4-cyclohexanedimethanol
NPG: neopentyl glycol
SPG: spiroglycol (ii) Master Batch Cell controlling agent master batch: having a polystyrene resin as a base resin, talc master batch containing 60% by weight of talc (trade name: HI-FILLER #12, manufactured by Matsumura Sangyo Co., LTd) was used.

Flame retardant master batch: a flame retardant master batch containing 93% by weight of hexabromocyclododecane was used.

(2) The evaluation method is described herein below.

(i) Evaluation of Foamability and Moldability

Evaluation of the foamability and moldability in Tables 3 to 6 was carried out according to the following evaluation criteria.

Good: The blowing state was good, and a favorable board-like extruded thermoplastic resin foam having no wave pattern (ripples), and the like was stably obtained.

Poor: The blowing state was poor, and a favorable board-like extruded thermoplastic resin foam could not be obtained having the wave pattern (ripples), and the like are formed on the surface.

(ii) Appearance of the Foam

Appearance of the foam was evaluated according to the following evaluation criteria.

In general, when Evaluation of Foamability and moldability is good, Appearance of the foam tends to be good.
good: Clean surface.
Poor: Severe cracks on the surface are observed.

(iii) Apparent Density

Apparent density was measured according to JIS K 6767 (1999). From three regions including the center region and two terminal regions of extruded thermoplastic resin foam, a rectangular sample having the thickness equivalent to the thickness of the foam was cut out. Each sample was measured for the apparent density. Arithmetic mean value of the measurement values obtained from the three regions was obtained as apparent density.

(iv) Cross-Section Area

The cross section area of the extruded thermoplastic resin foam corresponds to the cross section area of a vertical cross section which is perpendicular to the extrusion direction of the extruded thermoplastic resin foam (i.e., vertical cross section in the width direction).

(v) Thickness

To measure the thickness of the extruded thermoplastic resin foam, the extruded thermoplastic resin foam was divided into six pieces from one end to the other end in the width direction of the vertical cross section of the extruded thermoplastic resin foam, and five measurement spots were taken except the two ends. Subsequently, thickness of the extruded thermoplastic resin foam was measured at the five spots, and arithmetic mean value was obtained from the measurement values of the five spots.

(vi) Thermal Conductivity Ratio

Decrease ratio of the thermal conductivity indicates the value that is calculated by dividing the thermal conductivity value of the extruded thermoplastic resin foam obtained from the Examples or the Comparative examples by the thermal conductivity value of the extruded thermoplastic resin foam obtained from the Comparative example 1.

(vii) The Partial Pressure of the Atmospheric Component in the Cells

The partial pressure of the atmospheric component in the cells was determined as follows. Immediately after the production of an extruded thermoplastic resin foam, a test sample having no skin (200 mm×200 mm×25 mm: length×width× thickness) was cutout from the extruded thermoplastic resin foam. The resulting test sample was stored in atmosphere of 23° C. with humidity of 50%. By using the test sample kept for 100 days from the production, the measurement was carried out as follows. First, from the center part of the extruded thermoplastic resin foam, a sample (90 mm×25 mm×15 mm: length×width×thickness) was collected by extraction process. Subsequently, the sample was added into a container filled with ethanol and the air inside the container was removed. Then, toluene was added to the container while being careful not to introduce any air and the sample was dissolved in toluene. Air volume in the cell was measured and the partial pressure of the atmospheric component in the cells was determined.

(viii) Morphology

Extremely thin sample was prepared from the extruded thermoplastic resin foam. After the dyeing treatment, morphology at the cross section of cell membrane was visually determined by using a transmission electron microscope.

[Observation Condition]

Transmission electron microscope: "JEM-1010" manufactured by JEOL Ltd.
Acceleration voltage: 100 kV
Dye: ruthenium tetraoxide Further, the methods of measuring closed cells, average cell diameter in thickness direction, average cell deformation ratio, thermal conductivity, and remaining amount of blowing agent are the same as described above.

Examples 1 to 12, Comparative Examples 1 to 4, Reference Examples 1 to 3

A manufacturing apparatus used herein, a first extruder having inside diameter of 65 mm, a second extruder having inside diameter of 90 mm, and a third extruder having inside diameter of 150 mm are connected in series, an inlet for injecting a blowing agent is provided at longitudinal end of the first extruder, and a flat die which has an exit for resin (i.e., die lip) and rectangular cross section in the width direction (1 mm interval×90 mm width) is connected to the exit of the third extruder was used.

Further, at the exit for resin of the flat die, an additional shaping apparatus (guider) made of a pair of upper and low polytetrafluoroethylene resin, which is constructed with a plate positioned parallel to the exit, is formed. To have the mixing amount shown in Tables 3 to 6, the resin, the flame retardant, and the cell controlling agent were supplied to the first extruder, and heated to 220° C., melt and kneaded by mixing them. In addition, from the inlet for blowing agent provided near the tip part of the first extruder, the physical blowing agent having mixing composition and composition ratio shown in the tables was supplied and were molten to give a foamable molten resin composition. The resulting molten resin composition was continuously supplied to the second extruder and the third extruder, and the resin temperature was adjusted to the formability temperature as shown in the Tables (in the tables, it was described as temperature of foamed resin and this foamed resin temperature is the temperature of a foamable molten resin composition that is measured at the connection part between the extruder and the die). After that, while carrying out the extrusion and blowing from the die lip to the inside of the guider with discharge amount of 50 kg/hr, the composition was passed through the inside of the guider which is placed parallel to the thickness direction of the extruded foam with 28 mm interval to mold (form) the resin into a board-like shape. As a result, the board-like extruded thermoplastic resin foam was produced. The evaluation results are summarized in Tables 3 to 6.

The mixing ratio of the polystyrene resin (A) and the polyester resin (B) in Tables 3 to 6 is the ratio compared with 100% by weight of the base resin. For example, PS1/PS2 of 45/45 and S30 of 10 in Example 1 means that PS1 and PS2 are mixed as a styrene resin with the ratio of 45% by weight and 45% by weight, respectively, and S30 is mixed as a polyester resin with the ratio of 10% by weight.

As to the type of the blowing agent in Tables 3 to 6, MeCl indicates methyl chloride, i-B indicates isobutane, and $CO_2$ indicates carbon monoxide. Further, the addition amount ratio of the blowing agent is mole ratio, and the addition amount is amount by mole compared with 1 kg of the base rein. For example, type MeCl/i-B, mixing 50/50, and addition amount 1.2 mol/kg for Example 1 in Table 3 means that, 0.6 mole of methyl chloride and 0.6 mole of isobutane were added to 1 kg of the base resin.

[Evaluation Result]

Examples 1 to 6 were carried out by varying the type of the polyester resin which corresponds to the polyester resin (B) of the present invention. As a result, it was found that all of the obtained extruded thermoplastic resin foam had low thermal conductivity, excellent heat insulating property, and good appearance) with a high expansion ratio and a high percentage of closed cells.

In the Example 7, the extruded thermoplastic resin foam was obtained in the same manner as Example 1 except that the blowing agent is changed from MeCl/i-B to $CO_2$/i-B and the use amount of the cell controlling agent is reduced. The favorable extruded thermoplastic resin foam was obtained from Example 7 even under the condition of using a different blowing agent, showing that the thermal conductivity is also almost the same as Example 1, and appearance of the foam is good.

In the Example 8, the extruded thermoplastic resin foam was obtained in the same manner as Example 1 except that the polystyrene rein as a base resin is changed to a heat-resistant polystyrene resin. The favorable extruded thermoplastic resin foam was obtained from Example 8 even under the condition of a different foamed resin temperature, showing that the thermal conductivity is also almost the same as Example 1 and appearance of the foam is good.

Comparative example 1 is an example of a conventional extruded polystyrene resin foam which does not contain a polyester resin in the base resin. It was found that the foam obtained the Comparative example 1 had higher thermal conductivity than the foam of the Examples of the present invention, and good appearance. Further, the Comparative examples 2 and 3 are the examples in which a polyester resin other than the polyester resin (B) of the present invention is used for the base resin. Foamability and moldability, and appearance was deteriorated for all examples, and thus it was impossible to obtain favorable extruded thermoplastic resin foam.

In Examples 9 to 12 and Comparative example 4, the extruded thermoplastic resin foam was obtained in the same manner as Example 1 except that the mixing ratio of the polystyrene resin (A) and the polyester resin (B) is changed. According to these Examples and the Comparative example, it was found that, when the mixing amount of the polyester resin (B) is too small, the effect of lowering the thermal conductivity becomes insufficient. It was further found that the thermal conductivity of the extruded thermoplastic resin foam is lowered in accordance with the increase in the mixing amount of the polyester resin (B) while the mixing amount of the polyester resin (B) is within an appropriate amount range. And, it was found that evaluation of appearance of the foam is good.

TABLE 3

| | | | Unit | Example 1 | Example 2 | Example 3 | Example 4 |
|---|---|---|---|---|---|---|---|
| Resin composition | Polystyrene resin | Type | — | PS1/PS2 | PS1/PS2 | PS1/PS2 | PS1/PS2 |
| | | Mixing | % by weight | 45/45 | 45/45 | 45/45 | 45/45 |
| | Polyester resin | Type | — | S30 | S20 | S45 | PETG |
| | | Mixing | % by weight | 10 | 10 | 10 | 10 |
| | | | parts by weight | 11.1 | 11.1 | 11.1 | 11.1 |
| | Blowing agent | Type | — | MeCl/i-B | MeCl/i-B | MeCl/i-B | MeCl/i-B |
| | | Mixing | mole ratio | 50/50 | 50/50 | 50/50 | 50/50 |
| | | Addition amount | mol/kg | 1.2 | 1.2 | 1.2 | 1.2 |
| | Flame retardant master batch | | parts by weight | 5 | 5 | 5 | 5 |
| | Cell controlling agent master batch | | parts by weight | 4.2 | 5 | 4.2 | 4.2 |
| Production condition | Temperature of foamed resin | | °C. | 125 | 125 | 125 | 125 |
| | Discharge amount | | kg/hr | 50 | 50 | 50 | 50 |
| | Die pressure | | Mpa | 4 | 4 | 4.2 | 3.9 |
| Evaluation results | Foamability and moldability | | — | Good | Good | Good | Good |
| | Physical property of extruded thermoplastic resin foam | Apparent density | kg/m³ | 35 | 35 | 35 | 35 |
| | | Cross section area | cm² | 60 | 60 | 60 | 60 |
| | | Thickness | mm | 28 | 28 | 28 | 28 |
| | | Percentage of closed cells | % | 94 | 95 | 93 | 95 |
| | | Average cell diameter in thickness direction | mm | 0.15 | 0.18 | 0.15 | 0.15 |
| | | Average cell deformation ratio | — | 1.1 | 1 | 1.1 | 1.1 |
| | | Thermal conductivity (after 100 days) | W/m·K | 0.0272 | 0.0274 | 0.0273 | 0.0272 |
| | | Remaining amount of i-B in foam (after 100 days) | mol/kg | 3 | 3 | 3 | 3 |
| | | The partial pressure of the atmospheric component in the cells (after 100 days) | atm | 0.9 | 0.92 | 0.91 | 0.89 |
| | | Morphology | — | Sea-Island structure (Pe dispersion phase: layer) | Sea-Island structure (Pe dispersion phase: layer) | Sea-Island structure (Pe dispersion phase: layer) | Sea-Island structure (Pe dispersion phase: layer) |

| | | | | Example 5 | Example 6 | Example 7 | Example 8 |
|---|---|---|---|---|---|---|---|
| Resin composition | Polystyrene resin | Type | | PS1/PS2 | PS1 | PS1/PS2 | Heat resistantPS |
| | | Mixing | | 45/45 | 90 | 45/45 | 90 |
| | Polyester resin | Type | | PETN | S30 | S30 | S30 |
| | | Mixing | | 10 | 10 | 10 | 10 |
| | | | | 11.1 | 11.1 | 11.1 | 11.1 |
| | Blowing agent | Type | | MeCl/i-B | MeCl/i-B | $CO_2$/i-B | MeCl/i-B |
| | | Mixing | | 50/50 | 50/50 | 40/60 | 50/50 |
| | | Addition amount | | 1.2 | 1.2 | 1 | 1.2 |
| | Flame retardant master batch | | | 5 | 5 | 5 | 5 |
| | Cell controlling agent master batch | | | 4.2 | 4.2 | 1.7 | 4.2 |

TABLE 3-continued

| | | | | | | |
|---|---|---|---|---|---|---|
| Production condition | | Temperature of foamed resin | 125 | 125 | 125 | 143 |
| | | Discharge amount | 50 | 50 | 50 | 50 |
| | | Die pressure | 3.7 | 4.9 | 6 | 3.8 |
| Evaluation results | Foamability and moldability | | Good | Good | Good | Good |
| | Physical property of extruded thermoplastic resin foam | Apparent density | 35 | 35 | 35 | 35 |
| | | Cross section area | 60 | 60 | 60 | 60 |
| | | Thickness | 28 | 28 | 28 | 28 |
| | | Percentage of closed cells | 95 | 95 | 95 | 95 |
| | | Average cell diameter in thickness direction | 0.15 | 0.15 | 0.15 | 0.15 |
| | | Average cell deformation ratio | 1 | 1.1 | 1.2 | 1.1 |
| | | Thermal conductivity (after 100 days) | 0.0268 | 0.0271 | 0.027 | 0.0271 |
| | | Remaining amount of i-B in foam (after 100 days) | 3.1 | 3 | 3 | 3 |
| | | The partial pressure of the atmospheric component in the cells (after 100 days) | 0.78 | 0.88 | 0.86 | 0.85 |
| | | Morphology | Sea-Island structure (Pe dispersion phase: layer) | Sea-Island structure (Pe dispersion phase: layer) | Sea-Island structure (Pe dispersion phase: layer) | Sea-Island structure (Pe dispersion phase: layer) |

MeCl: methyl chloride
i-B: isobutene
$CO_2$: carbon dioxide
Pe: Polyester resin

TABLE 4

| | | | Unit | Comparative example 1 | Comparative example 2 | Comparative example 3 |
|---|---|---|---|---|---|---|
| Resin composition | Polystyrene resin | Type | — | PS1/PS2 | PS1/PS2 | Heat resistant PS |
| | | Mixing | % by weight | 50/50 | 45/45 | 90 |
| | Polyester resin | Type | — | — | PET | PET |
| | | Mixing | % by weight | — | 10 | 10 |
| | | | parts by weight | — | 11.1 | 11.1 |
| | Blowing agent | Type | — | MeCl/i-B | MeCl/i-B | MeCl/i-B |
| | | Mixing | mole ratio | 50/50 | 50/50 | 50/50 |
| | | Addition amount | mol/kg | 1.2 | 1.2 | 1.2 |
| | Flame retardant master batch | | parts by weight | 5 | 5 | 5 |
| | Cell controlling agent master batch | | parts by weight | 4.2 | 4.2 | 4.2 |
| Production condition | Temperature of foamed resin | | °C. | 125 | 130 | 143 |
| | Discharge amount | | kg/hr | 50 | 50 | 50 |
| | Die pressure | | MPa | 3.8 | 9.3 | 9.5 |
| Evaluation results | Foamability and moldability | | — | Good | Poor | Poor |
| | Physical property of extruded thermoplastic resin foam | Apparent density | kg/m³ | 35 | — | — |
| | | Cross section area | cm² | 60 | — | — |
| | | Thickness | mm | 28 | — | — |
| | | Percentage of closed cells | % | 95 | — | — |
| | | Average cell diameter in thickness direction | mm | 0.15 | — | — |
| | | Average cell deformation ratio | — | 1.1 | — | — |
| | | Thermal conductivity (after 100 days) | W/m·K | 0.0292 | — | — |
| | | Remaining amount of i-B in foam (after 100 days) | mol/kg | 3.0 | — | — |
| | | The partial pressure of the atmospheric component in the cells (after 100 days) | atm | 1.0 | — | — |
| | | Morphology | — | — | — | — |

MeCl: methyl chloride
i-B: isobutane

TABLE 5

| | | | Unit | Example 9 | Example 10 | Example 11 | Example 12 | Comparative example 4 |
|---|---|---|---|---|---|---|---|---|
| Resin composition | Polystyrene resin | Type | — | PS1/PS2 | PS1/PS2 | PS1/PS2 | PS1/PS2 | PS1/PS2 |
| | | Mixing | % by weight | 47.5/47.5 | 40/40 | 35/35 | 25/25 | 48.5/48.5 |
| | Polyester resin | Type | — | S30 | S30 | S30 | S30 | S30 |
| | | Mixing | % by weight | 5 | 20 | 30 | 50 | 3 |
| | | | parts by weight | 5.3 | 25 | 42.9 | 100 | 3.1 |
| | Blowing agent | Type | — | MeCl/i-B | MeCl/i-B | MeCl/i-B | MeCl/i-B | MeCl/i-B |
| | | Mixing | mole ratio | 50/50 | 50/50 | 50/50 | 50/50 | 50/50 |
| | | Addition amount | mol/kg | 1.2 | 1.2 | 1.2 | 1.2 | 1.2 |

TABLE 5-continued

|  |  |  | Unit | Example 9 | Example 10 | Example 11 | Example 12 | Comparative example 4 |
|---|---|---|---|---|---|---|---|---|
|  |  | Flame retardant master batch | parts by weight | 5 | 5 | 5 | 5 | 5 |
|  |  | Cell controlling agent master batch | parts by weight | 4.2 | 4.2 | 4.2 | 4.2 | 4.2 |
| Production condition |  | Temperature of foamed resin | ° C. | 125 | 125 | 125 | 125 | 125 |
|  |  | Discharge amount | kg/hr | 50 | 50 | 50 | 50 | 50 |
|  |  | Die pressure | MPa | 3.8 | 3.9 | 4.0 | 4.5 | 3.8 |
| Evaluation results | Foamability and moldability |  | — | Good | Good | Good | Good | Good |
|  | Physical property of extruded thermoplastic resin foam | Apparent density | kg/m³ | 35 | 35 | 35 | 39 | 35 |
|  |  | Cross section area | cm² | 60 | 60 | 60 | 60 | 60 |
|  |  | Thickness | mm | 28 | 28 | 28 | 28 | 28 |
|  |  | Percentage of closed cells | % | 95 | 95 | 95 | 91 | 95 |
|  |  | Average cell diameter in thickness direction | mm | 0.15 | 0.15 | 0.15 | 0.15 | 0.15 |
|  |  | Average cell deformation ratio | — | 1.1 | 1.1 | 1.1 | 1.1 | 1.1 |
|  |  | Thermal conductivity (after 100 days) | W/m·K | 0.0280 | 0.0268 | 0.0265 | 0.0258 | 0.0292 |
|  |  | Remaining amount of i-B in foam (after 100 days) | mol/kg | 3.0 | 3.1 | 3.1 | — | 3.0 |
|  |  | The partial pressure of the atmospheric component in the cells (after 100 days) | atm | 0.93 | 0.82 | 0.77 | — | 0.98 |
|  |  | Morphology | — | Sea-Island structure (Pe dispersion phase: layer) | Sea-Island structure (Pe dispersion phase: layer) | Sea-Island structure (Pe dispersion phase: layer) | Sea-Island structure (Pe dispersion phase: layer) | Sea-Island structure (Pe dispersion phase: layer) |

MeCl: methyl chloride
i-B: isobutene
Pe: Polyester resin

Reference examples 1 to 3 are examples in which gas substitution in the extruded thermoplastic resin foam is promoted by using methyl chloride having fast gas permeation rate as a physical blowing agent, and the thermal conductivity for a state in which the physical blowing agent contained in the heat insulation foam is replaced with air is measured by varying the mixing ratio between the polystyrene resin (A) and the polyester resin (B). Comparing Reference example 3 with Reference examples 1 and 2, it was found that the thermal conductivity of the heat insulation foam was lowered by mixing the polystyrene resin (A) with the polyester resin (B). According to Reference examples 1 to 3, the thermal conductivity is also lowered in the heat insulation foam wherein the remaining amount of the physical blowing agent has no effect. From the above, it was possible to confirm that the effect of lowering the thermal conductivity by mixing the polyester resin (B) is a result of the effect obtained from the inhibition of dissipation of a physical blowing agent from the foam and incorporation of air into the foam and other working effects.

TABLE 6

|  |  |  | Unit | Reference example 1 | Reference example 2 | Reference example 3 |
|---|---|---|---|---|---|---|
| Resin composition | Polystyrene resin | Type | — | PS1/PS2 | PS1/PS2 | PS1/PS2 |
|  |  | Mixing | % by weight | 45/45 | 45/45 | 45/45 |
|  | Polyester resin | Type | — | SPET30 | PETG | — |
|  |  | Mixing | % by weight | 10 | 10 | — |
|  |  |  | parts by weight | 11.1 | 11.1 | — |
|  | Blowing agent | Mixing | — | MeCl | MeCl | MeCl |
|  |  | Ratio | mole ratio | 100 | 100 | 100 |
|  |  | Addition amount | mol/kg | 1.2 | 1.2 | 1.2 |
|  |  | Flame retardant master batch | parts by weight | 5 | 5 | 5 |
|  |  | Cell controlling agent master batch | parts by weight | 4.2 | 4.2 | 4.2 |
| Production condition |  | Temperature of foamed resin | ° C. | 125 | 125 | 125 |
|  |  | Discharge amount | kg/hr | 50 | 50 | 50 |
|  |  | Die pressure | MPa | 3.9 | 3.8 | 3.7 |
| Evaluation results | Foamability and moldability |  | — | Good | Good | Good |
|  | Physical property of extruded foam | Apparent density | kg/m³ | 35 | 35 | 35 |
|  |  | Cross section area | cm² | 60 | 60 | 60 |
|  |  | Thickness | mm | 28 | 28 | 28 |
|  |  | Percentage of closed cells | % | 94 | 95 | 95 |
|  |  | Average cell diameter in thickness direction | mm | 0.15 | 0.15 | 0.15 |
|  |  | Average cell deformation ratio | — | 1.1 | 1.1 | 1.1 |
|  |  | Thermal conductivity (after 100 days) | W/m·K | 0.0352 | 0.0351 | 0.0371 |
|  |  | The partial pressure of the atmospheric component in the cells (after 100 days) | atm | 1.0 | 1.0 | 1.0 |

MeCl: methyl chloride
i-B: isobutane

What is claimed is:

1. An extruded thermoplastic resin foam having:
an apparent density of 20 to 50 kg/m$^3$;
a closed cells ratio of 85% or more; and
a thickness of 10 to 150 mm; and
containing a non-halogen organic physical blowing agent, wherein:
a thermoplastic resin composing the extruded foam contains a mixture of 100 parts by weight of a polystyrene resin (A) and 5 to 150 parts by weight of a polyester resin (B), which is a non-crystalline polyester copolymer containing a dicarboxylic acid component and a diol component, wherein a spiroglycol comprises 10 to 80 mol% of the entire diol component that is used to prepare said polyester resin (B) and
an endothermic calorific value of the polyester resin (B) is from 0 to less than 5 J/g for fusion of the polyester resin on a DSC curve obtained by heat flux differential scanning calorimetry based on JIS K7122 (1987).

2. The extruded thermoplastic resin foam according to claim 1, wherein the thermoplastic resin is composed of a mixture of 100 parts by weight of the polystyrene resin (A) and 10 to 130 parts by weight of the polyester resin (B).

3. The extruded thermoplastic resin foam according to claim 1, wherein the dicarboxylic: component contains an aromatic dicarboxylic acid or an alkyl ester thereof.

4. The extruded thermoplastic resin foam according to claim 3, wherein the dicarboxylic acid component is dimethyl terephthalate.

5. The extruded thermoplastic resin foam according to claim 1, wherein a melt viscosity (h) of the polyester resin (B) is within a range of 1000 to 6000 Pa·s at a temperature of 200° C. and a shear rate of 100 sec$^{-1}$.

6. The extruded thermoplastic resin foam according to claim 1, wherein a sea-island structure is formed in a cross section of a cell membrane of the extruded thermoplastic resin foam so that the polystyrene resin (A) forms a continuous phase and the polyester resin (B) forms a dispersion phase.

7. The extruded thermoplastic resin foam according to claim 1, wherein an amount of the non-halogen organic physical blowing agent remaining in the extruded thermoplastic resin foam is 0.1 to 0.9 mol with reference to 1 kg of the extruded thermoplastic resin foam at 100 days after manufacture.

8. The extruded thermoplastic resin foam according to claim 1, wherein a thermal conductivity of the extruded thermoplastic resin foam is 0.029 W/(m·K) or less.

* * * * *